United States Patent
Kohavi

(10) Patent No.: US 8,521,829 B2
(45) Date of Patent: *Aug. 27, 2013

(54) SYSTEM AND METHOD FOR PROVIDING CONDITIONAL ACCESS TO SERVER-BASED APPLICATIONS FROM REMOTE ACCESS DEVICES

(75) Inventor: Lior Kohavi, Shoham (IL)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/872,699

(22) Filed: Aug. 31, 2010

(65) Prior Publication Data

US 2010/0325362 A1 Dec. 23, 2010

Related U.S. Application Data

(63) Continuation of application No. 10/779,110, filed on Feb. 13, 2004, now Pat. No. 7,801,964.

(60) Provisional application No. 60/447,564, filed on Feb. 14, 2003.

(51) Int. Cl.
*G06F 15/16* (2006.01)
*G06F 15/173* (2006.01)
*G06F 15/177* (2006.01)

(52) U.S. Cl.
USPC ........... 709/211; 709/203; 709/217; 709/224; 709/206

(58) Field of Classification Search
USPC .......................... 709/211, 201, 203, 217–228
See application file for complete search history.

(56) References Cited

U.S. PATENT DOCUMENTS

| 6,138,162 | A | 10/2000 | Pistriotto et al. | |
|---|---|---|---|---|
| 6,151,599 | A | 11/2000 | Shrader et al. | |
| 6,918,113 | B2* | 7/2005 | Patel et al. | 717/178 |
| 6,959,320 | B2 | 10/2005 | Shah et al. | |
| 7,478,434 | B1* | 1/2009 | Hinton et al. | 726/27 |
| 7,720,686 | B2* | 5/2010 | Volk et al. | 700/94 |
| 7,801,964 | B2* | 9/2010 | Kohavi | 709/211 |
| 2002/0035617 | A1 | 3/2002 | Lynch et al. | |
| 2002/0055912 | A1 | 5/2002 | Buck | |
| 2002/0165971 | A1 | 11/2002 | Baron | |
| 2003/0088517 | A1 | 5/2003 | Medoff | |
| 2003/0135543 | A1* | 7/2003 | Kittredge et al. | 709/203 |
| 2004/0039827 | A1 | 2/2004 | Thomas et al. | |
| 2004/0073630 | A1 | 4/2004 | Copeland et al. | |
| 2004/0117376 | A1 | 6/2004 | Lavin et al. | |
| 2004/0230820 | A1* | 11/2004 | Hui Hsu et al. | 713/200 |

FOREIGN PATENT DOCUMENTS

WO WO02084565 10/2002

* cited by examiner

*Primary Examiner* — Haresh N Patel
(74) *Attorney, Agent, or Firm* — Lee & Hayes, PLLC

(57) ABSTRACT

Systems and methods are provided for providing users at remote access devices with conditional access to server-based applications. Requests for access to server-based applications (e.g., requests to launch or obtain data associated with the server-based applications) by remote access devices may be prevented or allowed based on device compliance with one or more policies including whether data-retention prevention code can be downloaded to and operational on the remote access devices. The data-retention prevention code may be used to both determine whether data can be automatically deleted from a cache or file directory at the remote access device and to delete potentially retention-sensitive data once the data is downloaded to the remote access device from the server-based application.

18 Claims, 6 Drawing Sheets

SYSTEM AND METHOD FOR PROVIDING CONDITIONAL ACCESS TO SERVER-BASED APPLICATIONS FROM REMOTE ACCESS DEVICES

CROSS REFERENCE TO RELATED APPLICATION

This application is a Continuation of, and claims priority to, U.S. patent application Ser. No. 10/779,110, filed on Feb. 13, 2004, entitled "System and Method for Providing Conditional Access to Server-Based Applications From Remote Access Devices," now U.S. Pat. No. 8,801,964, which issued Sep. 21, 2010. The present application claims the benefit of U.S. Provisional Patent Application No. 60/447,564, filed Feb. 14, 2003, which is hereby incorporated by reference herein in its entirety.

BACKGROUND

Access by remote users of server-based applications gives rise to several security risks. One of these is the risk that data will remain on a public, or otherwise unprotected, computer following the access of such data by a given user. This risk is exacerbated by the caching feature inherent in common web browsers. Although a user may successfully log off and terminate his session with the server, information such as cookies, web pages, images, and documents accessed during the session may remain stored in the temporary files of the computer terminal. In that case, subsequent users at the same terminal may be able to access such files, which may contain confidential or sensitive information, even though the original user has logged off and there is no longer any connection between the computer terminal and the server.

In order to address this concern, there are several alternatives currently available to eliminate or minimize risk. First, the user can manually use the menu on the Web browser to request that the cache on the browser be cleared. This feature, standard in most browsing software, deletes the temporary files from the terminal's hard drive. However, as a manual solution, this alternative relies on the ability and presence of mind of the users to consistently take this additional step. In addition, in the event that the terminal configuration is such that the user does not have this ability, by the time the user learns this, the user typically will already have downloaded the data. Second, the server, or a gateway in front of the server, may send HTML tags, HTTP headers, and/or other instructions to the browser requesting not to cache the information. However, given the variety of browsers and unpredictability of browser compliance with such instructions, there is no assurance of consistent effectiveness. Moreover, certain popular applications may not function properly when the browser is operating in "no-cache" mode. In addition, as in the case of the manual alternative, if it is unsuccessful, the downloaded data will remain on the terminal. Other available alternatives include application-specific programs which manage and define a private, application-specific cache separate from the browser cache (and which utilize the Web only as a means of transferring data). However, such a solution is by definition limited in scope and function, insofar as it cannot be used for generic applications, and may not run on all types of publicly accessible terminals.

SUMMARY

It is an object of the present disclosure to provide systems and methods for providing conditional access to server-based applications from remote access devices.

This and other objects are accomplished in accordance with the principles of the present disclosure by providing a conditional access application that allows conditional access to server-based applications from remote access devices.

The conditional access application may receive a request for access to a server-based application from a remote access device. For example, the conditional access application may receive a request from a user at an airport kiosk (i.e., an untrusted device) to access a company Intranet or to launch an application available on the company intranet (e.g., Microsoft Outlook). As another example, the conditional access application may receive a request for data (e.g., e-mail messages and/or attachments thereof) associated with a particular server-based application after the server-based application has been successfully launched. The conditional access application may download to the remote access device data-retention prevention code for deleting data from one or both of a cache and a file directory (e. g., a temporary Internet directory) at the remote access device. The conditional access application may prevent or allow the remote access application to access the server-based application based on whether the data-retention prevention code downloaded to the remote access device is operative to delete data from the cache and the file directory. Remote access devices that are provided with access to the server-based application by the conditional access application may not be required to install either or both of client software and client hardware associated with the server-based application.

In accordance with the disclosure, the conditional access application may download data retention prevention code to remote access devices that request access to one or more server-based applications. The data-retention prevention code may be used to both determine whether data can be automatically deleted from a cache or file directory at the remote access device and to delete potentially retention-sensitive data originating from the server-based application from the cache or file directory. This may, for example, prevent the potentially retention-sensitive data (e.g., confidential e-mail messages) from being accessed at the remote access device (e.g., a public computer terminal) by subsequent users. In accordance with the disclosure, once the data-retention prevention code has been downloaded to the remote access device, data may be automatically deleted at the remote access device at any suitable time and with any suitable frequency (e.g., after the passage of a predetermined period of time or period of user inactivity, continuously, in response to indications that the user has left the remote access device or logged off the application, in response to the user closing a Web browser or the browser crashing in response to a shutdown process being initiated at the remote access device, etc.).

In some embodiments of the present disclosure, the conditional access application may download to a remote access device code that signals back to the conditional access application whether the device complies with one or more policies deemed important to managing data requests from the device (e.g., whether the device has suitable antivirus software implemented thereon). The conditional access application may provide the remote access device with conditional access to server-based applications based on whether the device is policy compliant in addition to or irrespective of whether the above-described data-retention prevention code is operative on the device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure relates to systems and methods for providing users of remote access devices with conditional access to server-based applications. Examples of such systems and methods are described in above-incorporated Provisional Patent Application No. 60/447,564.

Figure 1:
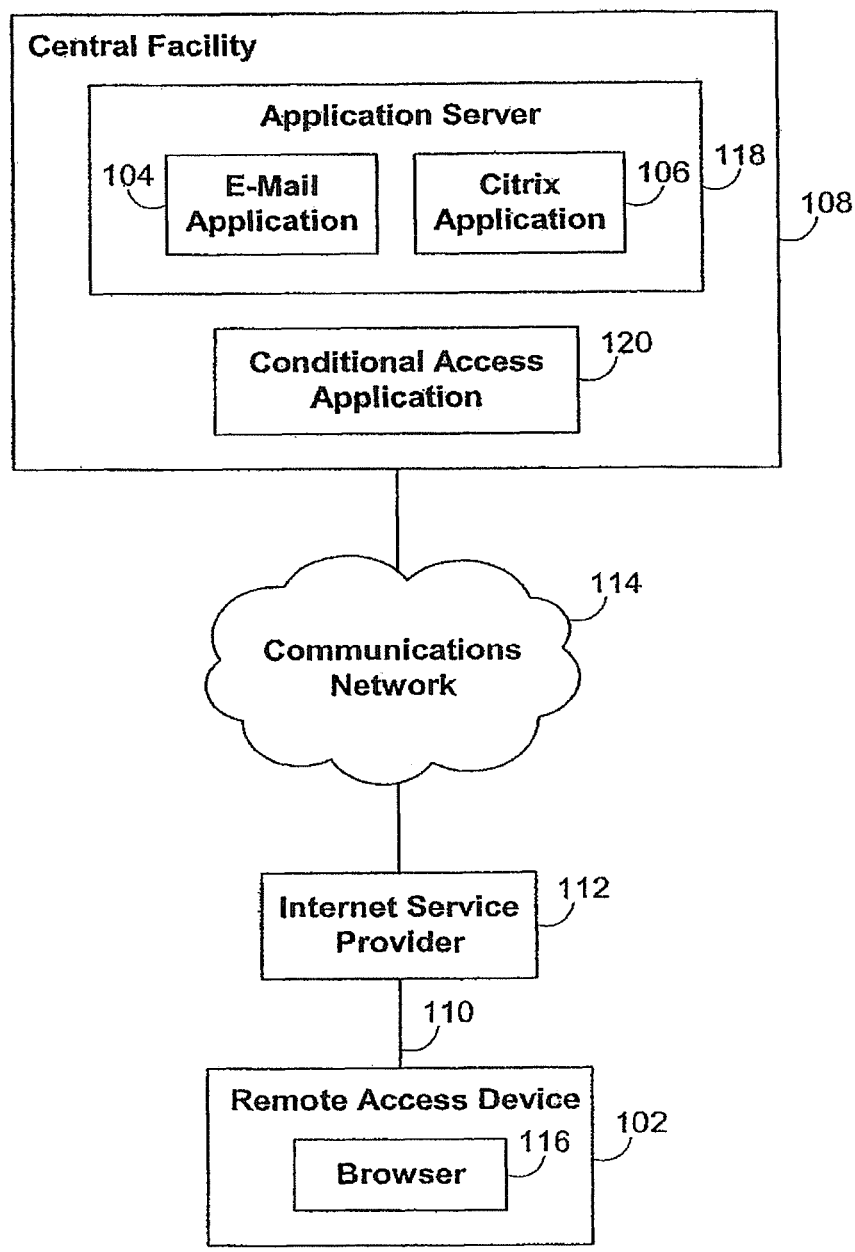
FIG. 1 is a diagram of an illustrative system in accordance with one embodiment of the present disclosure for providing remote access devices with conditional access to server-based applications.

FIG. 1 shows an illustrative conditional access system 100 in accordance one embodiment of the present disclosure. Remote access device 102 requests access to one or more of server-based applications 104 and 106 of central facility 108 via communications link 110, Internet Service Provider (ISP) 112 and communications network 114. Remote access device 102 may be any remote device capable of requesting access to applications 104 and 106 using browser 116 such as, for example, a computer terminal at an airport kiosk or a hotel business center, a wireless device such as a laptop computer, a cell phone or a personal digital assistant (PDA), or any other suitable remote access device having a browser implemented thereon. Server-based applications 104 and 106 are shown in FIG. 1 as being an e-mail application and a Citrix application, respectively. These are only illustrative examples of server-based applications and any other server-based applications may be included in system 100 in addition to or in place of applications 104 and 106 including, for example, financial applications, time and expense applications, customer relationship management (CRM) applications and human resources applications. System 100 is typically "clientless" in that remote access device 102 is not required to pre-install either or both of client software and client hardware in order to request access to server-based applications 104 and 106. Multiple remote access devices 102 may be included in system 100 (to allow a plurality of users at a corresponding plurality of remote access devices attempt to access server-based applications 104 and 106), although only one remote access device 102 has been included in FIG. 1 to avoid over-complicating the drawing.

Each of communications link 110 and communications network 114 may be any suitable wired or wireless communications path or combination of paths such as, for example, a local area network, wide area network, telephone network, cable television network, intranet, or Internet. Some suitable wireless communications networks may be a global system for mobile communications (GSM) network, a time-division multiple access (TDMA) network, a code-division multiple access (COMA) network, a Bluetooth network, or any other suitable wireless network.

Central facility 108 includes application server 118 and conditional access application 120 for managing requests from remote access device 102 for access to one or both of server-based applications 104 and 106. As used herein, the term "server" is not limited to a distinct piece of computing hardware or storage, but may also be a software application or a combination of hardware and software. Conditional access application 120 may act as a gateway between application server 118 and remote access device 102 by controlling and/or modifying the data that may be passed to and from remote access device 102 and application server 118. For example, conditional access application 120 may delete selectable links provided by application server 118 to prevent a user of remote access device 102 from having access to the links. As another example, conditional access application 120 may convert files requested by remote access device 102 to HTML before the files are sent to device 102 to prevent retention of the files by remote access device 102 (e.g., the files being deleted by standard cache control at device 102). Still another example, conditional access application 120 may modify configuration files before they are downloaded to remote access device 102 to disable the use of various options of an application by a user of device 102 (e.g., disabling printing using Citrix when a user accesses Citrix application 106 using an unprotected home computer). Conditional access application 120 may also send data or code of its own to remote access device 102. For example, as described in greater detail below in connection with FIG. 2, conditional access application 120 may send to remote access device 102 data-retention prevention code for managing local storage of potentially retention-sensitive data at remote access device 102.

Conditional access application 120 may include any suitable software, hardware, or both for providing conditional access to one or both of server-based applications 104 and 106. For example, in one embodiment of the present disclosure, conditional access application 120 may be a software component residing between application server 118 and remote access device 102. Conditional access application 120 may be, for example, a proxy that receives requests on behalf of application server 118 and eventually passes the requests to server 118 and responses from server 118 back to remote access device 102. As another example, conditional access application 120 may be a filter that interacts with server 118 in order to modify and/or control the request/response dataflow. It will be understood that any other suitable software, hardware, or both may be used to implement some or all of the features of conditional access application 120.

Conditional access application 120 and application server 118 may be implemented using one or more computers. For example, a single computer may have software that enables the computer to perform the 30 functions of both conditional access application 120 and application server 118. As another example, conditional access application 120 may be implemented using a first computer and application server 118 may be implemented using a second computer separate from the first computer. Conditional access application 120 and application server 118 are shown in FIG. 1 as being implemented at central facility 108. However, in some embodiments of the present disclosure, conditional access application 120 and application server 118 may be implemented at separate facilities and/or in a distributed arrangement (e.g., the conditional access application being at least partially implemented at a first facility separate from central facility 108 and at least partially implemented at central, facility 108).

Figure 2:
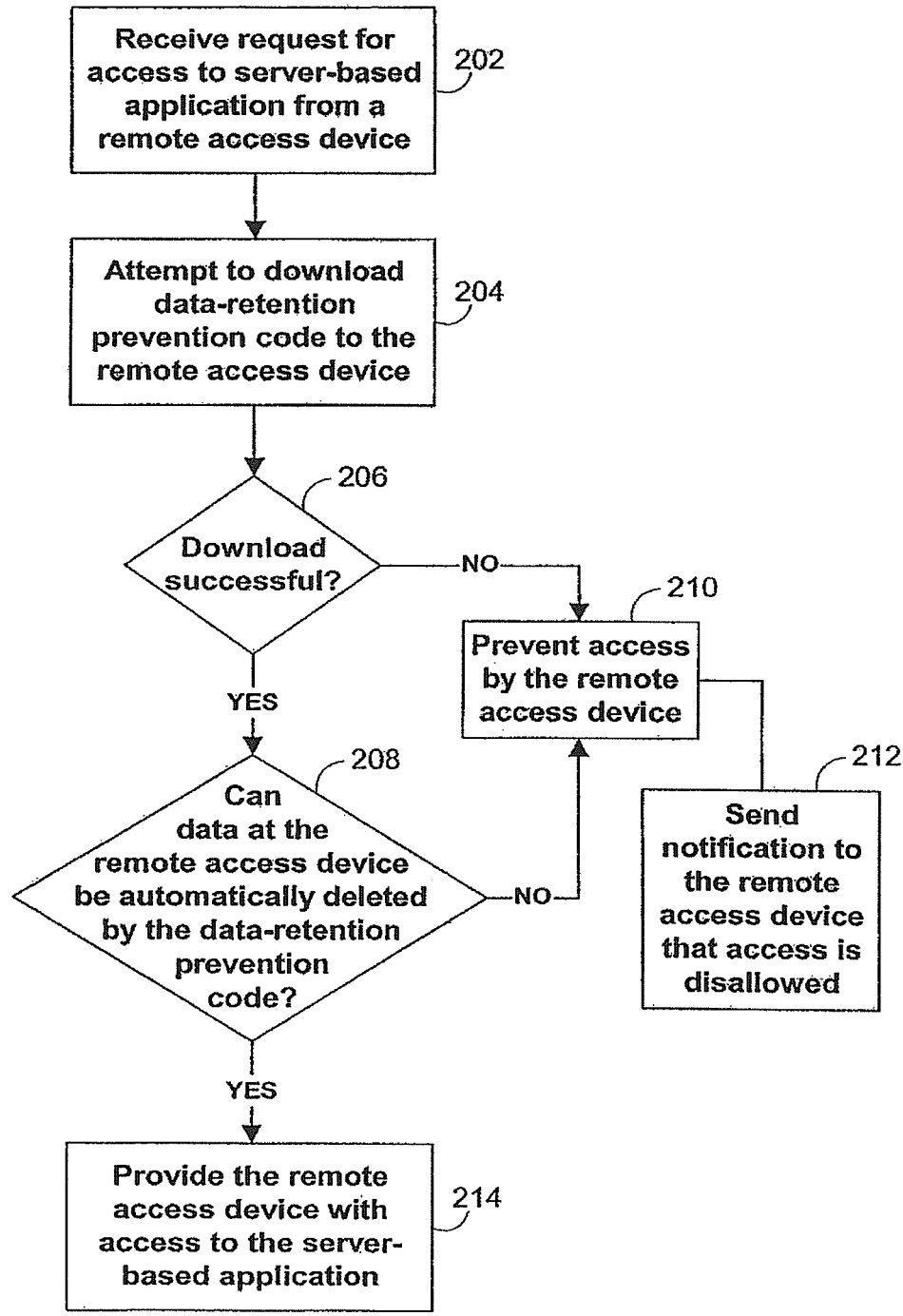
FIG. 2 is a flowchart of illustrative steps involved, in accordance with one embodiment of the present disclosure, in providing remote access devices 3D with conditional access to server-based applications.

FIG. 2 is a flowchart of illustrative steps involved in providing remote access devices with conditional access to server-based applications in accordance with one embodiment of the present disclosure. The conditional access application receives a request for access to one or more server-based applications from a remote access device at step 202. For example, the conditional access application may receive a request from a user at an airport kiosk to access a company Intranet or to launch an application available on the company Intranet (e.g., Microsoft Outlook). As another example, the conditional access application may receive a request for data (e.g., email messages and/or attachments thereof) associated with a particular server-based application after the server-based application has been successfully launched. At step 204, the conditional access application attempts to download data-retention prevention code to the remote access device. For example, the conditional access application may use DHTML to send commands instructing the remote access device to download the data-retention prevention code. As described in greater detail below, once the data-retention prevention code is downloaded to the remote access device, the data-retention prevention code signals to the conditional access application whether data (e.g., data from a browser cache, temporary internet directory or other directory) can be automatically deleted at the remote access device by the data-retention prevention code. If the data-retention prevention code cannot be downloaded to the remote access device (step 206), or if the code is successfully downloaded to the remote access device but cannot automatically delete data at the remote access device (step 208), the conditional access application may prevent the remote access device from accessing the one or more server-based applications at step 210. At step 212, the conditional access application sends a notification to the remote access device that access by the remote access device to the one or more server-based applications is disallowed (e.g., for display to the user by remote access device). If the data-retention prevention code is successfully downloaded to the remote access device and can automatically delete data at the remote access device, the conditional access application provides the remote access device with access to the one or more server-based applications at step 214. The conditional access application may repeat steps 206-214, and optionally step 204 (e.g., if the data-retention prevention code automatically uninstalls itself from the remote access device as described below), in response to receiving subsequent requests for access to the one or more server-based applications by the remote access device. In another approach, the conditional access application may perform steps 206 and 208 and optionally 204 only once in connection with the first request for access by the remote access device, and may store or access (e.g., from storage at the remote access device) the results there from for use in managing subsequent requests by the remote access application for access to the one or more server-based applications.

The data-retention prevention code of the present disclosure serves two general functions: initially to run a remote data-deletion test, and subsequently to run a data deletion operation. The data-retention prevention code may, for example, comprise code that is downloaded as part of an HTML page, such as DHTML code, accompanied by a module such as a Microsoft ActiveX component, as described below. The data-retention prevention code initiates the remote data-deletion test after the code is downloaded at the remote access device. The purpose of the remote data-deletion test is to verify before data is passed from the application server to the remote access device whether the data-retention prevention code will later be able to accomplish a data-deletion operation which deletes some or all data in the browser cache, temporary directory or other directory at the remote access device. Once downloaded, the remote data-deletion test may be run immediately, in response to the first request made by the remote access device to launch a given one or more server-based applications, upon the first request of a predetermined type or category of requests, or at any other suitable time.

The remote data-deletion test of the data-retention prevention code may test the predicted success of and/or emulate the data deletion operation of the data-retention prevention code. In particular, because the browser may be configured to disallow downloads of a type similar to the data-deleting component of the data-retention prevention code, or may be configured to permit such downloads but disallow launching thereof, or may permit both the download and launch of such code but nevertheless may impede the ability of the data-deleting component to delete data from the browser cache, temporary directory or other directory at the remote access device, the remote data-deletion test tests and signals' to the conditional access application whether such obstacles to the successful performance of the data deletion operation are likely present.

Figure 3:
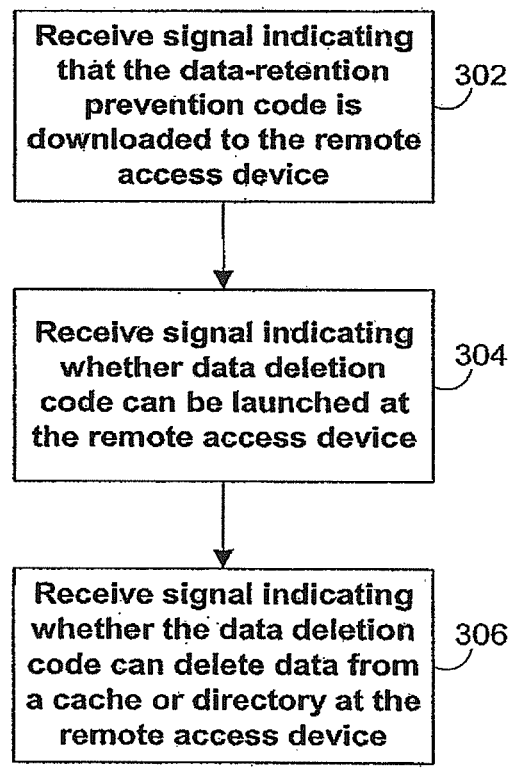
FIG. 3 is a flowchart of illustrative steps involved, in accordance with one embodiment of the present disclosure, in determining whether data can be automatically deleted from a cache or directory at a remote access application.

FIG. 3 is a flowchart of illustrative steps involved in determining whether the data-retention prevention code can automatically delete data from a cache or directory at a remote access application in accordance with one embodiment of the present disclosure. At step 302, the conditional access application receives from the data-retention prevention code a signal indicating that the data-retention prevention code has been successfully downloaded to the remote access device. In one embodiment of the present disclosure, signals from the data-retention prevention code downloaded to the remote access device may be provided to the conditional access application using DHTML. The conditional access application may register the download as having failed (e.g., after passage of a specified period of time) unless the conditional access application receives the signal indicating otherwise from the data-retention prevention code.

At step 304, the conditional access application receives from the data-retention prevention code a signal indicating whether the data-deletion code can be successfully launched. This signal may be provided to the conditional access application using, for example, DHTML. For example, the conditional access application may use DHTML to command the remote access device to launch the data-retention prevention code. If the data deletion code is subsequently successfully launched, the data retention prevention code may notify the conditional access application of such launch. The data retention prevention code may, for example, alter the HTTP session state using a cookie to signal to the conditional access application that the data deletion code has successfully launched at the remote access device.

At step 306, the conditional access application receives from the data-retention prevention code a signal indicating whether the data-deletion code can successfully delete data from a cache, temporary directory or other directory at the remote access device. For example, in one embodiment of the present disclosure, sample data may be downloaded from the conditional access application to a cache or directory at the remote access device (e.g., as part of step 204 (FIG. 2). The data-retention prevention code may use the data deletion code to attempt to delete such data, and may signal to the conditional access application whether such deletion was successful. Alternatively or in addition, the data-retention prevention code may check operating system permissions of the data-deletion code to delete files from a given location and may signal this information to the conditional access application.

Figure 4:
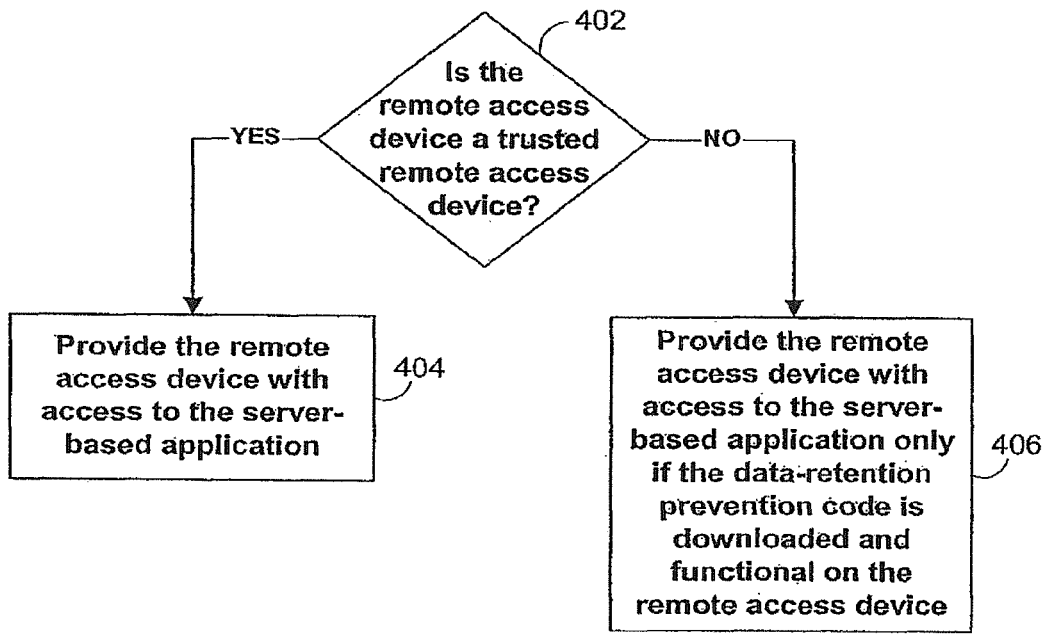
FIG. 4 is a flowchart of illustrative steps involved, in accordance with one embodiment of the present disclosure, in providing untrusted remote access devices with conditional access to server-based applications.

In some embodiments of the present disclosure, the conditional access application may provide a remote access device with conditional access to server-based applications based on the identity or location of the remote access device. FIG. 4 is a flowchart of illustrative steps involved in providing conditional access to untrusted remote access devices in accordance with one embodiment of the present disclosure. At step 402, the conditional access application determines whether a remote access device requesting access to a server-based application is a trusted or an untrusted remote access device. A trusted remote access device may be a device that belongs to a trusted party and that was previously marked as such in a manner that the conditional access application is configured to recognize. For example, a trusted remote access device may have a token such as a digital certificate or a cookie which may be detected by or passed to the conditional access application (e.g., detected or passed simultaneously with or following the remote access device requesting access to the server-based application). If the conditional access application determines that the remote access device is a trusted device, the conditional access application may provide the remote access device with access to the server-based application at step 404. If the conditional access application determines that the remote access device is an untrusted device, the conditional access application may provide the remote access device with access to the server-based application at step 406 only if the data-retention prevention code is downloaded and can be used to delete data at the remote access device. The conditional access application may determine whether the data-retention prevention code is downloaded and functional on the untrusted remote access device using, for example, steps 204-210 (FIG. 2), which may be performed prior to or after the conditional access application determining that the remote access device is an untrusted device.

In some embodiments of the present disclosure, the conditional access application may attempt to download and execute the data-retention prevention code to a remote access device even when the remote access device is a trusted device. For example, the conditional access application may attempt to download the data-retention prevention code to trusted remote access devices, but may provide the trusted remote access devices with access to a server-based application even if the code does not function properly thereon (e.g., due to restrictions on the trusted remote access devices). In some embodiments of the present disclosure, the conditional access application may only attempt to download the data-retention prevention code to untrusted remote access devices.

In some embodiments of the present disclosure, the conditional access application may provide remote-access devices with conditional access to particular types of data associated with one or more server-based applications. In particular, some data associated with one or more server-based applications (e.g., applications 104 and 106 (FIG. 1)) may be designated as retention-sensitive data, whereas other data associated with the applications may be designated as non-retention-sensitive data. For example, the conditional access application may restrict the passage of one type of data regardless of the outcome of the remote data-deletion test, permit the passage of a second type of data regardless of the outcome of the remote data-deletion test, and permit the passage of a third type of data only if the remote data-deletion test was successful. The conditional access application may determine the categorization of data for the above purpose based on various criteria associated with the request for data by the remote access device including, for example, specific URLs, URL types, URL categories, URL patterns, data content, data format, or any other suitable criteria. For example, the conditional access application may determine that data associated with a given plurality of URLs is retention-sensitive data (e.g., by storing or accessing a list of retention-sensitive URLs), and may provide remote access devices with access to such data, for example, only if the remote data-deletion test was successful at the remote access device. As another example, the conditional access application may pre-determine that data associated with a given plurality of URLs is retention-neutral. If the remote data-deletion test is unsuccessful at a given remote access device, the conditional access application may block access by that device to all data other than data associated with the retention-neutral URLs. Similarly, the conditional access application may provide conditional access to data associated with categories of retention-sensitive or retention-neutral URL types or formats (rather than, or in addition to, specific URLs). For example, data categorized by the conditional access application as confidential data (e.g., email attachments and/or other files) may be regarded as retention-sensitive by the conditional access application.

Figure 5:
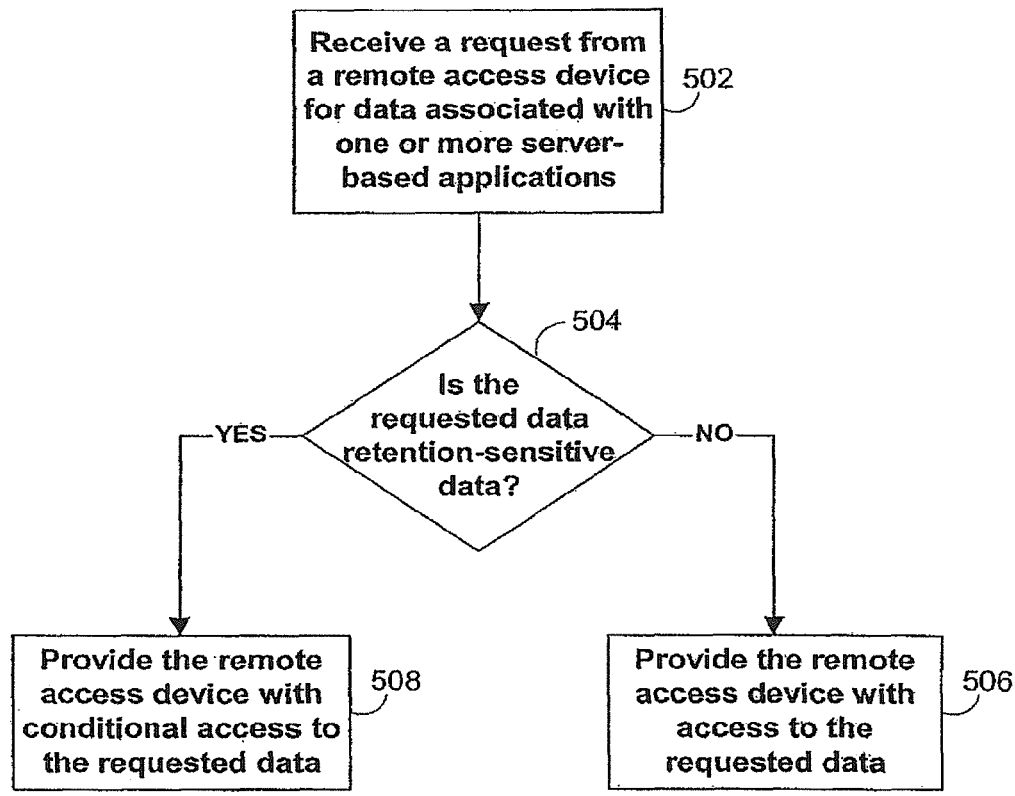
FIG. 5 is a flowchart of illustrative steps involved, in accordance with one embodiment of the present disclosure, in providing remote access devices with conditional access to retention-sensitive data associated with server-based applications.

FIG. 5 is a flowchart of illustrative steps involved in providing remote access devices with conditional access to retention-sensitive data in accordance with one embodiment of the present disclosure. The conditional access application receives a request for data associated with one or more server-based applications from a remote access device at step 502. At step 504, the conditional access application determines whether the data requested by the remote access device is retention-sensitive data. If the requested data is non-retention-sensitive data, the conditional access application may provide the remote access device with access to the requested data at step 506. If the requested data is retention-sensitive data, the conditional access application may provide conditional access to the requested data at step 508. For example, the conditional access application may provide the remote access device with access to the requested retention-sensitive data if either the remote access device is a trusted remote access device or if the data-retention prevention code is downloaded to and can be used to delete data at the remote access device. Each of these determinations may be made by the conditional access application prior to, after or simultaneously with the conditional access application determining that the data requested by the remote access device is retention-sensitive data. As another example, the conditional access application may provide the remote access device with access to the retention-sensitive data only if the data-retention prevention code is downloaded and functional on the remote access device. The conditional access application may prevent remote access devices from launching one or more server-based applications or accessing data associated with the server-based applications based on any suitable criteria. For example, the conditional access application may prevent a remote access device from launching Microsoft Outlook or a Citrix application if, for example, the data-retention prevention code is not downloaded and operational on the remote access device. The conditional access application may, for example, maintain or access a list of one or more server-based applications having retention-sensitive data associated there-with, and may prevent remote access devices from accessing applications included in the list. As another example, the conditional access application may prevent a remote access device from launching a server-based application (e. g., Microsoft Outlook) or accessing data associated with the server-based application if the conditional access application determines that the device does not comply with one or more policies deemed important to managing data requests from the device (e.g., a policy requiring one or more of suitable antivirus software, a suitable firewall and a suitable operating system implemented on the remote access device for the device to have access privileges). The conditional access application may download code (e.g., as part of or separate from the data retention prevention code) to the remote access device that signals back to the conditional access application whether the device complies with the one or more policies. Remote access devices complying with a first set of policies may be provided with a first level of access privileges, whereas remote access devices complying with a more inclusive set of policies may be provided with more comprehensive access privileges. In this way, any suitable number of tiers of conditional access may be provided. Illustrative steps involved in preventing a remote access device from launching a server-based application or accessing data associated with the server-based application may be similar to the steps shown in FIG. 2.

Figure 6:
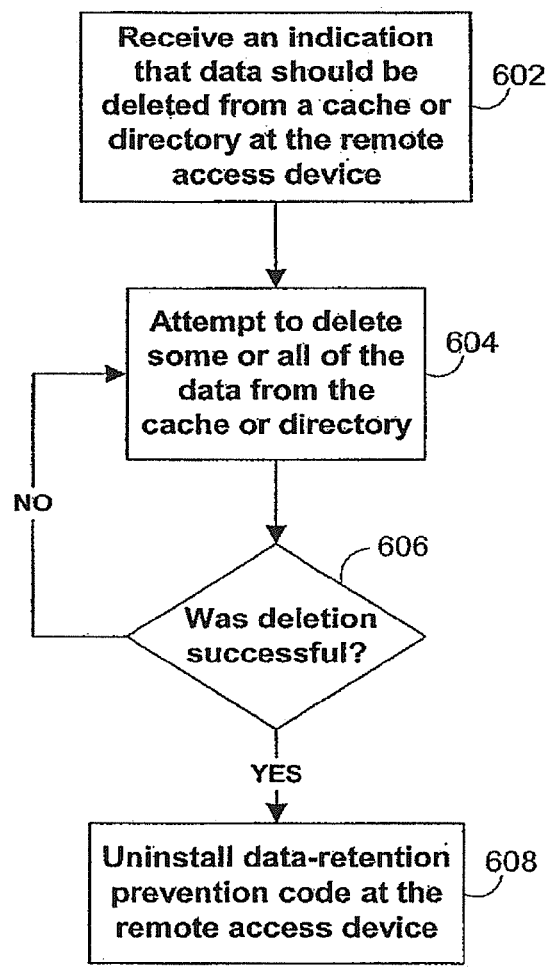
FIG. 6 is a flowchart of illustrative steps involved, in accordance with one embodiment of the present disclosure, in automatically deleting data from a cache or directory at a remote access device.

In accordance with the present disclosure, data may be automatically deleted from a cache or directory at a remote access device at any given time and with any suitable frequency when the data-retention prevention code is downloaded and operational on the remote access device. FIG. 6 is a flowchart of illustrative steps involved in deleting data from a cache or directory at a remote access device in accordance with one embodiment of the present disclosure. At step 602, the data-retention prevention code or the conditional access application receives an indication that data should be deleted from a cache or directory at the remote access device. For example, the occurrence of a predetermined period of time (e.g., measured from user log-in) or a designated period of user inactivity may indicate to the conditional access application or to the data retention prevention code that data should be deleted at the remote access device. The data retention prevention code may cause data at the remote access device to be deleted automatically, for example, automatically in response to the indication (i.e., when the data-retention prevention code monitors such indications) or in response to commands from the conditional access application. In some embodiments of the present disclosure, data may be deleted from a cache or directory at the remote access device on a continuous basis. As another example, data may be deleted at the remote access device in response to an indication that the user who had previously accessed one or more server-based applications has left the remote access device, or has or has otherwise attempted to log off the application or end the user's session, thereby giving rise to the concern that retention-sensitive data stored at the remote access device and is accessible to subsequent users (e.g., the user closing the browser, the user accessing a different website or application than the those protected by the conditional access application, the user clicking a logoff "button" or otherwise requesting a logoff or similar URL, the initiation of a shutdown process at the remote access 20 device, etc.). Still another example, data may be deleted from a cache or directory at the remote access device in response to the data-retention prevention code determining that the browser has crashed at the remote access device or in response to other indications of an abnormal exit from the user's session.

At step 604, the data-retention prevention code attempts to delete some or all of the data from the cache or directory at the remote access device. In one embodiment of the present disclosure, the data deleting component of the data-retention prevention code is comprised of a module that runs in an operating system process that is separate from the context of the browser, one example of which is a Microsoft ActiveX out-of-proc component. In some embodiments of the present disclosure, only certain types of data may be deleted pursuant to predetermined rules or categories including, for example, a policy to delete all data generated from a given source (e.g., all URL's associated with the same domain) or data that is designated by the conditional access application as retention-sensitive data.

At step 606, the conditional access application or the data-retention prevention code may determine whether the data deletion operation was successful. If the data deletion was successful, the execution of the data deletion code may cease and the data-retention prevention code may or may not uninstall itself from the remote access device at step 608. If the data deletion was unsuccessful, the data-retention prevention code may retry to delete the targeted data at step 604 until the operation is' successful. This may be useful, for example, where data targeted for deletion (e.g., file data) is in current use by the user and therefore temporarily locked and prevented from deletion by the operating system. Thus, a repeated or continuous execution of the data-deletion code increases the likelihood of success of the data actually being deleted (i.e., deleted once the user discontinues the user's use of the data).

CONCLUSION

Thus, in accordance with the present disclosure, systems and methods are provided for providing: conditional access to server-based applications from remote access devices. One skilled in the art will appreciate that the present disclosure can be practiced by other than the described embodiments, which are presented for purposes of illustration and not of limitation, and the present disclosure is limited only by the claims which follow.

What is claimed is:

1. A computer-implemented method for providing conditional access to server-based applications from remote access devices, the method comprising:
   downloading sample data to one or both of a cache and a file directory at a remote access device, the sample data being associated with a server-based application and downloaded to the one or both of the cache and the file directory when the remote access device is provided with access to the server-based application;
   downloading a data-retention prevention code to the remote access device to delete the sample data from one or both of the cache and the file directory;
   receiving a signal indicating that the data-retention prevention code is to be launched;
   notifying the server-based application that the data-retention prevention code is enabled in response to launching the data-retention prevention code;
   attempting to delete the sample data from the one or both of the cache and the file directory;
   determining whether the sample data has been deleted from the one or both of the cache and the file directory; and preventing the remote access device from accessing the server-based application when the sample data has not been deleted from the one or both of the cache and the file directory.

2. The method of claim 1, wherein the remote access device comprises an untrusted remote access device.

3. The method of claim 1, wherein when the sample data is deleted from the one or both of the cache and the file directory the data-retention prevention code uninstalls itself from the remote access device.

4. The method of claim 1, wherein when the sample data is not deleted from the one or both of the cache and the file directory the data-retention prevention code retries to delete the sample data until the operation is successful.

5. The method of claim 1, further comprising:
receiving an indication that data downloaded to the one or both of the cache and the file directory is to be deleted; and
deleting the data downloaded to the one or both of the cache and the file directory from the one or both of the cache and the file directory.

6. The method of claim 5, wherein deleting the data downloaded is in response to an indication or in response to a command from a conditional access application.

7. The method of claim 1, wherein when the sample data is deleted from the one or both of the cache and the file directory the data-retention prevention code uninstall itself from the remote access device.

8. A computer-readable storage device storing instructions which when executed by one or more processors, cause the one or more processors to:
download sample data to one or both of a cache and a file directory at a remote access device, the sample data being associated with a server-based application and downloaded to the one or both of the cache and the file directory when the remote access device is provided with access to the server-based application;
download a data-retention prevention code to the remote access device to delete the sample data from the one or both of the cache and the file directory;
receive a signal indicating that the data-retention prevention code is to be launched;
notify the server-based application that the data-retention prevention code is enabled;
attempt to delete the sample data from the one or both of the cache and the file directory;
determine whether the sample data has been deleted from the one or both of the cache and the file directory; and
provide the remote access device with access to the server-based application when the data-retention prevention code has deleted the data from the one or both of the cache and the file directory.

9. The computer-readable storage device of claim 8, further comprising instructions which when executed by the one or more processors, cause the one or more processors to:
determine whether the data-retention prevention code is operative to delete the sample data from the one or both of the cache and the file directory.

10. The computer-readable storage device of claim 8, further comprising instructions which when executed by the one or more processors, cause the one or more processors to determine whether the remote access device is a trusted device or an untrusted device.

11. The computer-readable storage device of claim 10, wherein when the remote access device is the trusted device, the instructions when executed by the one or more processor, cause the one or more processors to provide the remote access device with access to the server-based application even if the data-retention prevention code is not operable or not completely operable to delete the sample data from the remote access device.

12. The computer-readable storage device of claim 10, wherein when the remote access device is the untrusted device, the instructions when executed by the one or more processor, cause the one or more processors to provide the remote access device with access to the server-based application only if the data-retention prevention code is downloaded and operable to delete the sample data from the remote access device.

13. A system comprising:
a remote access device comprising executable instructions which when executed by one or more processors, cause the one or more processors to perform operations including:
downloading a data-retention prevention code from a server-based application, the data-retention prevention code for deleting data from one or both of a cache and a file directory at the remote access device;
downloading data from a server-based application to the one or both of the cache and the file directory of the remote access device;
receiving a signal indicating that the data-retention prevention code is to be launched;
notifying the server-based application that the data-retention prevention code is enabled in response to launching the data-retention prevention code;
receiving another signal indicating that data downloaded to the one or both of the cache and the file directory is to be deleted; and
automatically deleting the data downloaded to the one or both of the cache and the file directory from the one or both of the cache and the file directory.

14. The system of claim 13, the operations further comprising receiving notification from the server-based application that access to the server-based application is disallowed, in response to an attempt to access the server based application when the data-retention prevention code is disabled.

15. The system of claim 13, the operations further comprising notifying the server-based application when the downloading of the data-retention prevention code failed.

16. The system of claim 13, wherein the remote access device comprises an untrusted remote access device.

17. The system of claim 13, wherein the remote access device comprises a trusted remote access device.

18. The system of claim 13, wherein when the data downloaded is deleted from the one or both of the cache and the file directory the data-retention prevention code uninstalls itself from the remote access device.

* * * * *